United States Patent [19]
Orlov

[11] Patent Number: 5,136,807
[45] Date of Patent: Aug. 11, 1992

[54] ARRANGEMENT FOR GROWING PLANTS

[75] Inventor: Dov Orlov, Kfar Maimon, Israel

[73] Assignee: Gro-Max Systems, Inc., Dover, Fla.

[21] Appl. No.: 470,481

[22] Filed: Jan. 26, 1990

[51] Int. Cl.⁵ .............................................. A01G 9/02
[52] U.S. Cl. ........................................................ 47/83
[58] Field of Search ........................... 47/82, 83, 86, 79

[56] References Cited

U.S. PATENT DOCUMENTS

| | | | |
|---|---|---|---|
| 440,141 | 11/1890 | Dearborn | 47/83 |
| 3,073,061 | 1/1963 | Pearson | 47/83 |
| 3,137,095 | 6/1964 | Pearson | 47/83 |
| 3,293,798 | 12/1966 | Johnson, Sr. | 47/83 |

FOREIGN PATENT DOCUMENTS 195220  9/1986  European Pat. Off. ................ 47/62

Primary Examiner—David A. Scherbel
Assistant Examiner—Michele A. Van Patten
Attorney, Agent, or Firm—Browdy and Neimark

[57] ABSTRACT

An arrangement for growing plants which includes a multiplicity of containers each having a bottom face, side walls and an open upper face, the containers being at least partially filled with a medium for growing plants and being stacked in the form of a self-supporting columns, and all containers above the lowest one being supported at least indirectly by a container positioned below, the stacking formation allowing an open space to remain between the side walls of upper and lower containers or between the projections thereof. Drain apertures are provided in each container for allowing excess fluid to exit therefrom, and the excess fluid draining system communicates with a lower container of each column.

17 Claims, 2 Drawing Sheets

ARRANGEMENT FOR GROWING PLANTS

The present invention relates to an arrangement for growing plants, optimizing available ground area.

Greenhouses are expensive relative to the value of the crops grown therein, thus any method enabling more plants to be grown in the same greenhouse area is of economic interest. This situation has led to various attempts to intensify utilization of greenhouse height, resulting in proposals to hold the plant soil or the containers holding this soil at a number of levels. These frameworks, however, suffer from a number of disadvantages. They are expensive and they are extremely difficult to move should changing requirements dictate single-level cultivation. Furthermore, standard irrigation systems are designed for use on a single level and are difficult to adapt for use on multiple levels. Finally, those frameworks holding the soil directly, not being equipped with removable soil containers, do not allow convenient rearrangement of plants for purposes of cultivation, adaption to changing climate or to harvesting.

One known attempt to provide a more adaptable means of growing plants in greenhouses uses a liquid consisting of water plus fertilizers as a plant growing medium, but this arrangement suffers from loss of water-entrained air, as the liquid is static and subject to heating. For the same reason it has also been found difficult to control the acidity-level of the fluid.

A further known attempt to provide a multi-level support for plants consists of a vertical pipe, having walls pierced by holes at various levels and having the pipe interior filled with soil, plants being grown having their roots inside the pipe and their stems projecting through the pipe wall holes. Plant development was unsatisfactory due to the lack of any horizontal soil area, and also due to excessive soil compression at the lower level.

The object of the present invention is to overcome all these difficulties, providing a multi-level plant growing arrangement which can be easily altered and an irrigation system adaptable, without modification, to any variation of this arrangement.

It is a further object of the present invention to provide an arrangement for growing plants wherein the irrigation and draining system of one group of plants is separated from another group in the arrangement, thereby avoiding the transfer of plant diseases from one group to the other.

This is achieved by the present invention by providing an arrangement for growing plants, comprising a multiplicity of containers, each having a bottom face, side walls and an open upper face, said containers being at least partially filled with a medium for growing plants and being stacked in the form of a self-supporting column, all containers above the lowest one being supported at least indirectly by the container directly below, the stacking formation allowing an open space to remain between the side walls of upper and lower containers or between the projection thereof, and further comprising means in each container for allowing excess fluid to exit therefrom.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings

Figure 1:
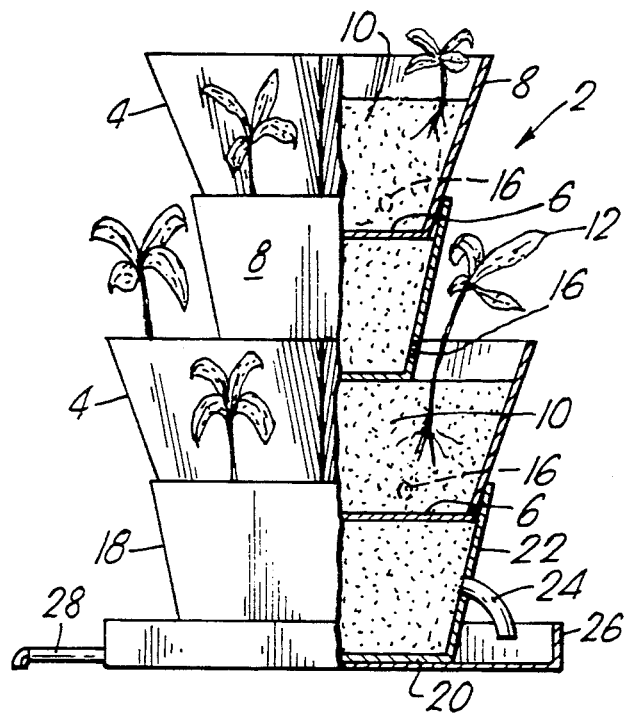
FIG. 1 is an elevation and partial cross-section of a first embodiment of a number of plant containers.

Referring to FIG. 1, there is seen a column 2 of stacked polygonally configured containers 4, each container 4 having a bottom wall 6 and side walls 8. In the particular embodiment shown in FIG. 1 side walls 8 slope upwards and outwards. A plant-growing medium 10 which may be soil, gravel or other material is held within the container 4, and plants 12 are grown near the periphery of the top surface 14 of medium 10. The side walls 8 adjacent to the bottom wall 6 of each of the stacked containers 4 is provided with one or more holes 16. Side wall 22 of the lowermost container 18 is fitted with a drain tube 24, which directs drain water to a drain tray 26. The drain water is adapted to be recycled in a fluid recycling system which will be described hereinafter with reference to FIG. 4.

In an alternative embodiment, the lowermost container 18 may be positioned on the ground, there being no drain tray, and the drain tube 24 is directly connected to a fluid recycling system.

In contradistinction to common plant containers where the draining holes are made in the bottom wall thereof, according to the present invention the draining holes are advantageously made in the side walls at locations exposed to light, preferably to direct sunlight, so as to prevent the plant roots which only grow in darkness, to penetrate the holes, thereby clogging the very important drainage passageways. The growth of roots into the drain tubes may be prevented or at least slowed down by using a tube made of light-transparent material. In addition, special measures may be taken for directing ambient light towards the drain holes and tubes, for example, by placing light-reflecting material near the holes, on the ground, inside the drain trays 26 and on the surface 14 of the medium 10. Such light-reflecting material may be white plastic sheets.

Figure 2:
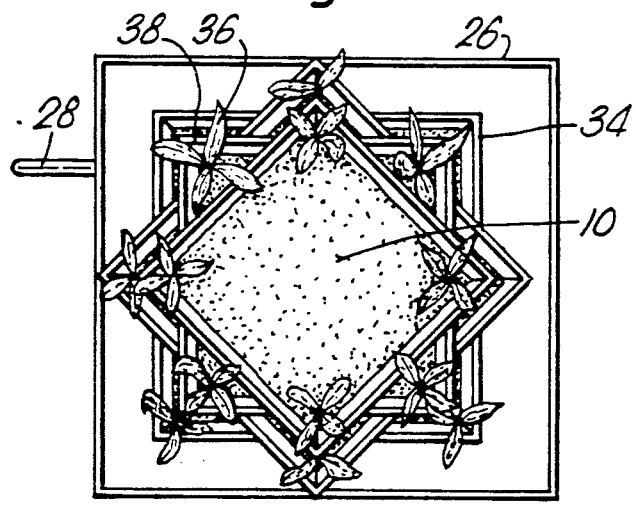
FIG. 2 is a top plan view of containers stacked in a skewed fashion.

FIG. 2 pertains to an embodiment where the side walls of the plant containers 34 form a square. Each container 34 has a smaller open area than its supporting container, thus large plants 36 being positioned near the corners 38 of the containers and each container 34 is skewed 45° relative to its supporting container.

In a further possible embodiment (not shown), the upper mid-portions of the side walls of each container are formed with shoulders or recesses configured to support the walls of the bottom corners of a container positioned in a skewed fashion. Suitable shoulders or recesses may be formed during the moulding process of the containers.

A larger number of smaller plants may be cultivated where each of the polygonally configured, stacked containers is a pentagon or a hexagon (not shown) instead of a square.

Figure 3:
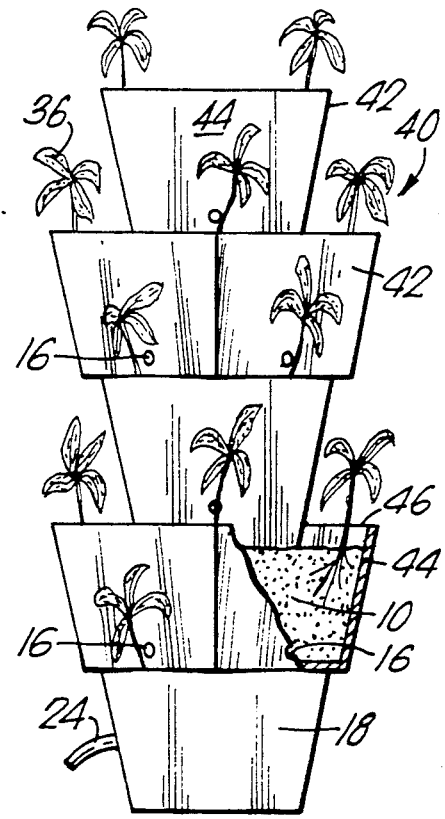
FIG. 3 is an elevation, partially broken away, of a further embodiment of plant containers.

FIG. 3 pertains to an alternative embodiment of plant containers. A column 40 of stacked containers is built up of a number of containers 42, all containers being of identical dimensions and the container walls 44 forming a polygon in horizontal cross-section. Each container is skewed 45° relative to its supporting container, thus, an upper container rests on the upper edge 46 of the walls 44 of the container beneath, thereby the plant growth medium 10 is not subject to compression. Walls 44 can be seen to slope outwards, providing extra space for plants 36. Alternatively, as shown in FIG. 4, there may be provided containers 48 of circular or oval configuration, of similar or different sizes and advantageously having slanting walls.

Figure 4:
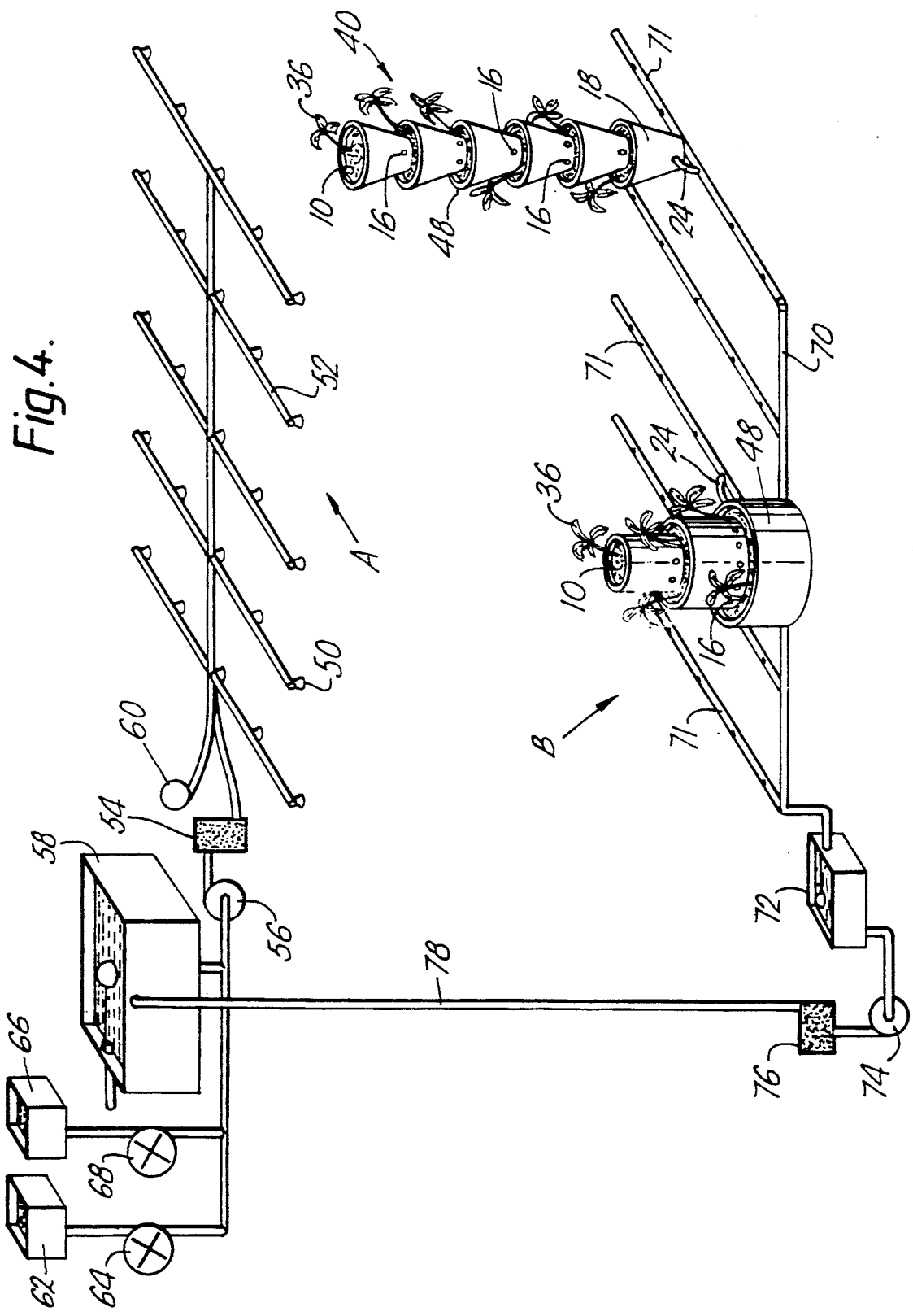
FIG. 4 is a schematic view of the fluid feed and recycle system, also illustrating two further configurations of plant containers.

The fluid supply system illustrated in FIG. 4 consists of an irrigation network A and of a drainage network B. The irrigation network including an array of drip orifices 50 spaced apart on a horizontal plane above the highest container 48 of a plant container column 40. Orifices 50 are connected to a piping network 52, leading through a filter 54 and a pump 56 to a water feed tank 58. A venturi-type aerator 60 is also provided. The irrigation arrangement further includes an additional feed tank 62 holding liquid fertilizer and having an outlet controlled by a metering pump 64 and a third feed tank 66 holding pesticides, the output of which is similarly controlled by a metering pump 68. A second network of piping, consisting of a main drain line 70 and branch lines 71, is arranged on a horizontal plane near or on the ground level, connects the drain tubes 28 to a collecting tank 72. The outlet of the collecting tank 72 communicates via a pump 74, a filter 76 and a return pipe 78 with the feed tank 58.

In operation, the plant growing arrangement functions as follows. Containers 48 are partially filled with plant growing medium 16 and plants 18 are sown or planted near outer periphery of the top surface. A drain tray 30 (FIG. 1) may optionally be positioned under a drip orifice 50, and a multiplicity of containers 48 is stacked, as previously described, to form self-supporting columns 40. Containers 48 can be arranged in a height saving manner as shown in FIGS. 1 to 4 where the lower face of each container rests on the upper face of the plant growing medium 16, or otherwise by placing the bottom wall of one container on top of the upper edges of the side walls of the container beneath it, as shown in FIGS. 2 and 3. Irrigation fluid from orifice 50 drips into the highest container of a column and some of this fluid is absorbed by plants 36 of the uppermost container. Excess fluid transfers via holes 16 (FIG. 1) to the next lowest container and so on. Excess fluid from the lowest container 18 to the collecting tank 72 drains via tubes 24, the tray 26 and drain tube 32, where a drain tray is provided, or directly into the lines 71, to be collected in the collecting tank 72 for reuse. The pump 74 propels the liquid from the collecting tank 72 via the filter 76 where the liquid is suitably purified, and pipe 78 to feed tank 58. Advantageously, liquid fertilizer and pesticides stored in feed tanks 62 and 66 are fed to the irrigation network by means of pump 56, in a controlled manner as set by the metering pumps 64 and 68, respectively. The mixture of water and the additives from feed tanks 62 and 66 are filtered through filter 54, aerated by means of the aerator 60 and thus, the recirculated and prepared irrigation fluid is reused.

It can now be readily understood that with this arrangement for growing plants, the draining fluid from each planting column 40 passes directly to the branch line 71 to which it is connected and therefrom the drain fluid continues to the main line, without passing through other branch lines, to be collected in a collecting tank and eventually purified for reuse. Thus this arrangement assures that an infected plant will not spread the disease throughout the entire area or greenhouse.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An arrangement for growing plants, comprising:
    a multiplicity of individual containers each having a bottom wall, side walls and an open upper face, said containers being at least partially filled with a medium for growing plants and being stacked in the form of a self-supporting column, and all containers above the lowest one being supported at least indirectly by a container positioned below, the stacking formation allowing an open space to remain between the side walls of upper and lower containers or between the projections thereof;
    drain means in each of the stacked containers above the lowest one for allowing excess fluid to exit therefrom and to drain into a container located immediately below; and
    an excess fluid draining system communicating with a lower container of said column.

2. The arrangement as claimed in claim 1, further comprising a fluid feed system wherein excess fluid supplied by said feed system in any container drains into the next lower container, said excess fluid being collected from the lowest container by a drainage system.

3. The arrangement as claimed in claim 2, further comprising means for pumping said collected excess fluid up to a feed tank for reuse.

4. An arrangement for growing plants, comprising:
    a multiplicity of individual containers each having a bottom wall, side walls and an open upper face, said containers being at least partially filled with a medium for growing plants and being stacked in the form of a self-supporting column, and all containers above the lowest one being supported at least indirectly by a container positioned below, the stacking formation allowing an open space to remain between the side walls of upper and lower containers or between projections thereof;
    drain means in at least the side walls of said containers for allowing excess fluid to exit therefrom; and
    an excess fluid draining system communicating with a lower container of said column.

5. An arrangement for growing plants, comprising:
a multiplicity of individual containers each having a bottom wall, side walls and an open upper face, said containers, except a lowest container, being at least partially filled with a medium for growing plants and being stacked above said lowest container in the form of a self-supporting column, and all containers above the lowest one being supported at least indirectly by a container positioned below, the stacking formation of said container above the lowest one allowing an open space to remain between the side walls of upper and lower containers or between projections thereof;
drain means in each container for allowing excess fluid to exit therefrom; and
excess fluid draining system communicating with said lowest container of said column.

6. A plant growing and irrigating arrangement comprising:
a multiplicity of individual containers each having a bottom wall, side walls and an open upper face, at least most of said containers being at least partially filled with a medium for growing plants and being stacked in the form of self-supporting plurality of columns, and all containers in a column above a lowest one being supported at least indirectly by a container positioned below, the stacking formation allowing an open space to remain between the side walls of upper and lower containers or between projections thereof;
drain means in each container for allowing excess fluid to exit therefrom;
draining network means in fluid communication with said columns for collecting excess fluid exiting from said columns;
irrigating network means including an array of fluid emitting orifices disposed above said columns; and
excess fluid recycling means for propelling said excess fluid from said draining network to said irrigating network.

7. The arrangement as claimed in claim 6 further comprising means for conditioning said excess fluid prior to propelling the fluid to said irrigating network.

8. A plant growing and irrigating arrangement in accordance with claim 6, wherein
all said containers in each said column above the lowest container are supported by a sidewall of the container immediately positioned therebelow, all said containers in a column being generally the same size, said drain means in each said container comprising at least one hole provided in a sidewall of said container,
said draining network means comprising an individual fluid collection means for each column, and means for collecting together said individual drainage collection means, and
said arrangement further comprising means for purifying fluid collected by said draining network means prior to passage to said fluid recycling means.

9. A plant growing and irrigating arrangement according to claim 8 wherein said irrigating network means comprises a venturi aerator.

10. The arrangement as claimed in claim 1, 4, 5 or 6, wherein the side walls of said container slope upwards and outwards.

11. The arrangement as claimed in claim 1, 4, 5 or 6, wherein at least some of the upper containers have a smaller base area than containers below them.

12. The arrangement as claimed in claim 1, 4, 5 or 6, wherein the walls of each of said containers form a polygon having corners and wherein said containers are stacked so that each upper container is skewed, relative to the container supporting it, at an angle, providing plant space near the polygon corners.

13. The arrangement as claimed in claim 1, 4, 5 or 6, wherein said drain means are one or more holes made in at least one of said side walls above said bottom wall.

14. The arrangement as claimed in claim 13 wherein fluid supply is arranged to provide for irrigation, fertilizer, pesticide or any combination thereof.

15. The arrangement as claimed in claim 1, 4, 5 or 6, further comprising light reflecting surfaces placed adjacent to said drain means for directing light thereon.

16. The arrangement as claimed in claim 1, 4, 5 or 6, wherein said lower container communicates with said draining system via a transparent conduit directly connected to said system.

17. An arrangement as claimed in claim 1, 4, 5 or 6, wherein each said container is only partially filled with said medium for growing plants, and wherein said bottom wall of each upper container is spaced above said medium for growing plants in a container therebeneath so that each said bottom wall does not come into contact with growing medium therebeneath.

* * * * *